(No Model.)

R. B. VANDERBURG.
SAUCEPAN.

No. 513,221. Patented Jan. 23, 1894.

WITNESSES
Thos. J. Routy Jr.
Jas. T. O'Neale

Robert B. Vanderburg
INVENTOR
By A. H. Evans & Co.
Attorneys

UNITED STATES PATENT OFFICE.

ROBERT B. VANDERBURG, OF LONG BEACH, ASSIGNOR OF THREE-FOURTHS TO LUDOVIC J. PAINTER, OF SATICOY, CALIFORNIA.

SAUCEPAN.

SPECIFICATION forming part of Letters Patent No. 513,221, dated January 23, 1894.

Application filed June 7, 1893. Serial No. 476,883. (No model.)

*To all whom it may concern:*

Be it known that I, ROBERT B. VANDERBURG, a citizen of the United States, residing at Long Beach, in the county of Los Angeles and State of California, have invented certain new and useful Improvements in Saucepans, of which the following is a full, clear, and exact description of the same, reference being had to the accompanying drawings, and to letters and figures of reference marked thereon, which form a part of this specification.

My invention relates to that class of saucepans generally used for boiling eatables, and consists in the construction and arrangements of parts which will enable me to empty the liquid contents of the saucepan without removing the cover or taking hold of the vessel, thereby avoiding all danger of being scalded.

In order to enable others skilled in the art to which my invention appertains to make and use the same, I will now proceed to describe its construction and operation, referring to the annexed drawings, in which—

Figure 1:
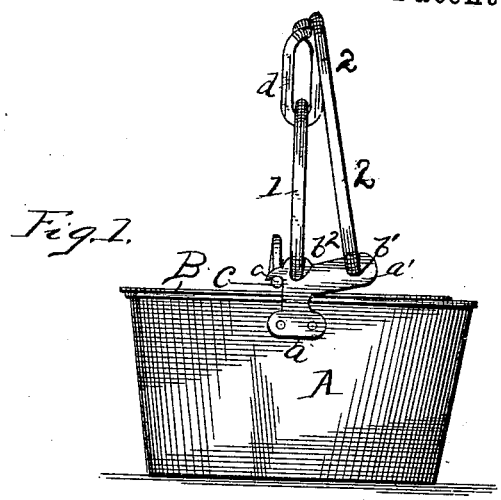
Figure 2:
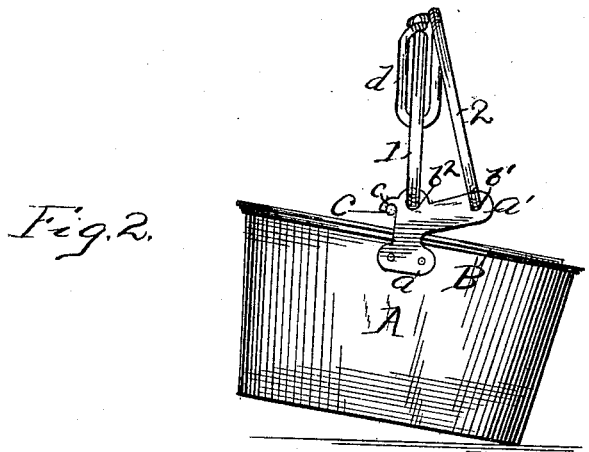
Figure 3:
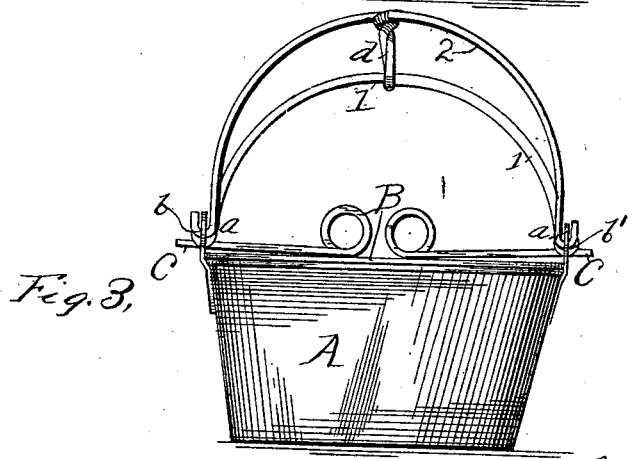

Figure 1, represents a side view of my improved saucepan. Fig. 2, is a similar view showing the vessel in a tilted position. Fig. 3, is a front view of the same.

In the drawings, A represents a saucepan having riveted on its opposite sides ears $a$ having extensions $a'$ provided with holes $b'$, said ears provided with holes $b^2$ adapted to receive the bail 1.

2 denotes a second bail which is bent upon itself to form a loop $d$, through which the bail 1, is guided and held in an upright position; said bail passes through a hole $b'$ in the ear. The rear of these ears are provided with shoulder or hooks $c$ adapted to receive the outer ends of the wire C, said wire being attached to the top of the cover, and bent upon itself so as to form a spring, thus holding the cover B, in position while the water or other liquid is being poured from the saucepan.

In order to pour the liquid from the contents of the saucepan, all that is necessary, is to grasp the bail 1, and press the bail 2 downward, which will force the saucepan in a tilted position as shown in Fig. 2, thus straining the contents of the pan.

Having thus described my invention, what I claim as new, and desire to secure by Letters Patent of the United States, is—

1. A cooking utensil provided with ears on opposite sides thereof, and two bails attached to said ears at opposite sides thereof, so that when the bails are squeezed together the utensil will be tipped.

2. A cooking utensil provided with ears, two bails attached thereto at different points, and a cover provided with rods engaging said ears, substantially as herein described.

ROBERT B. VANDERBURG.

Witnesses:
L. DECKER,
W. W. LOWE.